Figure 1:
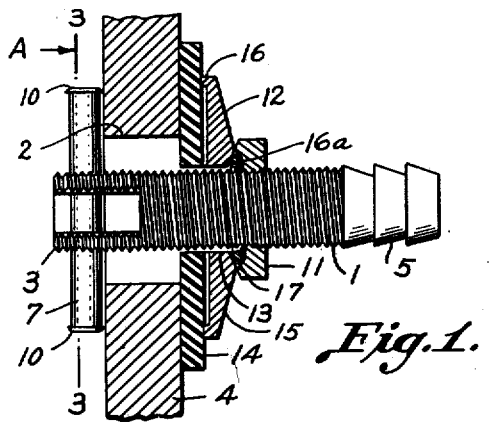

June 7, 1949.  P. G. CALDWELL ET AL  2,472,569
MEANS FOR SECURING A PIPE FITTING
TO A PLATE, WALL, OR THE LIKE
Filed Jan. 21, 1947

Inventor
PERCY GRAHAM CALDWELL,
AND LIONEL WILLIAM HOPE-WALTON
By Albert F. Nathan,
Attorney Patented June 7, 1949

2,472,569

UNITED STATES PATENT OFFICE 2,472,569

MEANS FOR SECURING A PIPE FITTING TO A PLATE, WALL, OR THE LIKE

Percy Graham Caldwell and Lionel William Hope-Walton, London, England

Application January 21, 1947, Serial No. 723,328
In Great Britain January 26, 1946

8 Claims. (Cl. 285—25)

1

The present invention relates to improvements in means for securing a pipe fitting (e. g., a coupling component having a union nipple, nut or other connection for a length of hose, flexible or rigid piping or the like) to a plate, wall or the like, hereinafter termed "the wall" and is particularly suited to cases where access to the rear or inside of the wall is only possible through a small hole in such wall through which hole it is desired that the pipe fitting shall establish communication with the space behind the wall.

As an example of such a case, is the core hole of an internal combustion engine of a motor vehicle where it is desired to promote heating of the cooling liquid of such engine on the thermo-siphonic principle while the vehicle is standing idle, or for coupling up piping or tubular or grid type heating circuits for heating the interior of vehicles such as ambulances, etc., whilst such are on the road, and for this purpose to connect the heating means directly with an inflow point of the water jacket of the engine rather than with the outflow which connects the upper portion of the engine jacket with the upper portion of the radiator, it having been found that the heating of the water in the engine jacket is more quickly accomplished by connecting the outlet from the heater straight into the jacket. Some engines have a core hole near the back about half way up and this is a good position to make the connection.

The inlet to the heater may be connected by a circulating pipe with the pipe connecting the bottom of the radiator with the main inflow to the water jacket.

It is however difficult and sometimes impossible to drill the core-hole and connect a pipe fitting or adaptor therein owing to lack of space to apply the drill.

Whilst the present invention is not limited in application to liquid circulating systems and heating means therefor (it may for example have application to barrel taps) it will be convenient to describe it in its relation to heating the liquid, usually water, of the engine cooling system of a motor vehicle so as to minimise the damage to the engine and/or radiator in frosty weather, or to maintain the engine at a satisfactory temperature for efficient working when started up.

One object of the present invention is to deskill the operation of making a pipe connection with the engine casting, this operation having to be regarded as introducing undue risk of damage to the engine if incompetently carried out, or even if competently carried out, the wall of the

2 core hole being usually very rough and requiring unusually careful and skilful treatment to make a satisfactory union.

A further object of the invention is to provide a form of pipe fitting which can be readily fitted (even in confined fitting spaces) in a hole without machining the wall of the hole, e. g., in a core-hole as aforesaid without the necessity of applying a drilling or other tool to the hole for the purpose of making the connection.

A further object of the invention is to enable the fitting to be readily detached from the wall to which it is fitted. For example where the fitting is applied to a rough core-hole as aforesaid, it may not make an effective seal at the first application and therefore it should be capable of being easily removed and re-applied, and in other cases, such as tap fittings for barrel bung-holes, it is necessary that the fitting should be capable of being easily removed from one barrel and fitted to another.

A further object of the invention is that there should not be an undue projection of the device into the interior. For example in fitting the device to an engine wall if the device projects unduly into the interior it would be obstructed by the cylinder walls themselves.

A further object of the invention is to construct the fitting such that it shall not unduly restrict the flow therethrough.

According to the present invention we provide a pipe fitting adapted to be clamped into sealing relation with a hole in a wall, such as the wall of an engine casing, comprising a screw-threaded tube and a nut-operated jointing means for sealing the fitting to the hole, one end of the tube being adapted to be passed freely through the hole and having a displaceable head of such dimensions as to be capable of bridging the hole and bearing on the inside of the wall on opposite sides of the hole, the head being adapted to be displaced in relation to the tube so that it may be passed obliquely through the hole and then displaced by shaking the fitting to bridge the hole as aforesaid so that it will thrust against the said wall on the inside while the nut is operated to clamp the jointing means, and to be shaken into a position in which it may be easily withdrawn through the hole when the clamping pressure is released.

The aforesaid head may be a cross pin passing through opposed holes in the tube and headed to make the pin captive to the screw, and preferably the pin passes through a bifurcated end of the tube so as not unduly to obstruct the flow through the tube.

The pin advantageously has one or more annular grooves adapted to be engaged by the wall of the hole or holes in the tube when the fitting is moved or shaken to bring the pin into proper operative position.

The fitting preferably comprises at least one joint ring or joint washer and a coned or domed disc or washer (referred to hereinafter and in the claims as a "domed" disc), the disc being provided with a marginal rib on one face adapted to press a face joint washer into sealing engagement with the face of the object around the hole and being reversible to enable the domed face of the disc to press a joint ring into a countersinking or annular recess of the hole to make the joint.

The outer end of the tube may be formed as a nozzle or nipple, e. g., may be annularly serrated or grooved for this purpose, to enable it to be coupled to a hose. The tube may have an elbowed outer end to promote compactness in the bend of the conduit, particularly where limited space for such bend is present between the wall and adjacent surfaces.

In order that the present invention may be the more readily understood, reference is hereinafter made to the accompanying drawings which show by way of example forms of fitting and one application thereof according to the invention.

Figure 2:
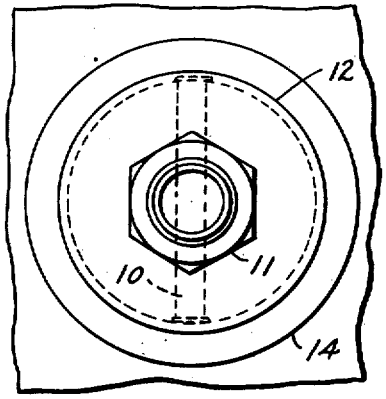
Figure 3:
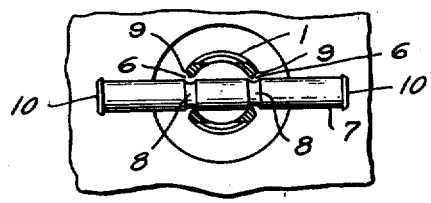
Figure 5:
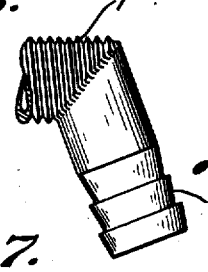
Figure 4:
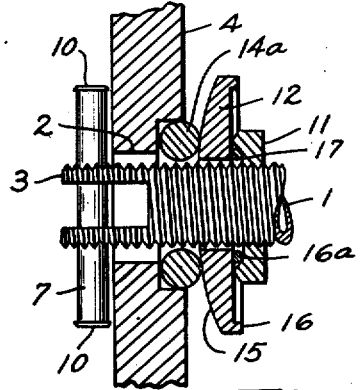
Figure 7:
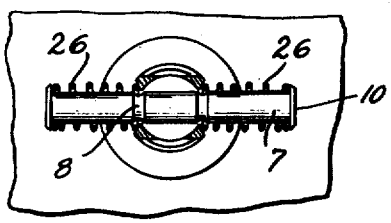
Figure 6:
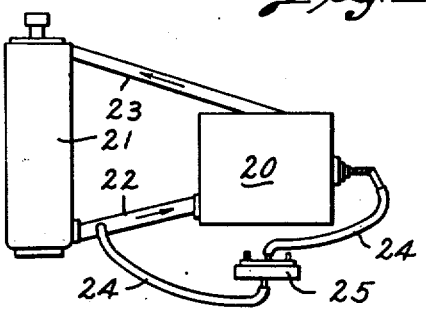
Figure 8:
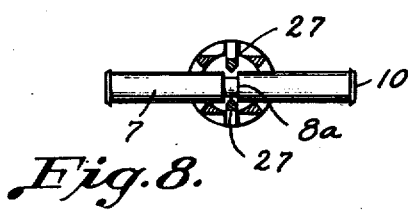

Fig. 1 is a sectional plan view and Fig. 2 an end view, while Fig. 3 is a sectional view on the line 3—3 of Fig. 1 looking in the direction of the arrow A. Fig. 4 is a sectional plan showing the fitting used with another form of packing and Fig. 5 is a view of the tube of the fitting provided with an elbow end. Fig. 6 is a diagrammatic view of a thermo-siphonic liquid circulating system in connection with which the fitting is particularly suited for use. Fig. 7 shows a spring-influenced cross-pin for the fitting. Fig. 8 shows a fragmentary section of a modified form.

Referring to Figs. 1 to 3, the pipe fitting comprises an externally screw threaded coupler tube 1 the end 3 of which is to pass through a hole 2 in the wall 4 and the other end 5 of which is annularly serrated or grooved to form a hose-connecting nozzle. The diameter of the aforesaid hole is larger than the external diameter of said screw thread.

The end 3 of the coupler tube which is to project beyond the inside of wall 4 is bifurcated for promoting liquid flow and transversely apertured at 6, 6 for the reception of a cross pin 7 which medially is provided with a pair of spaced annular grooves 8, 8, designed to interlock with the limbs of the aforesaid bifurcation. The apertures 6 are shown as countersunk at 9 to facilitate longitudinal displacement of the pin into or out of engagement with the limbs. The ends of the pin are headed over at 10 to render the pin captive in the holes in the limbs of the bifurcation. A back nut 11 is provided to screw into engagement with the screw threaded portion of the tube and, for threading along the screw so as to be nearer the inside end of the screw than the nut, in the order opposite to that given, are provided a disc 12 having a hole 13 which clears the thread and a rubber or like face joint washer 14 for making a resilient packing to secure tightness at the joint to be made between the pipe fitting and the face of the wall around the hole 2.

The disc 12 is domed on one face 15 and its other face is dished or provided with a marginal rib 16 and the disc is reversible according to the nature of the sealing joint required. In Fig. 1 the marginally ribbed face of the disc is presented to the face joint washer and when the nut is tightened the pressure is applied to the washer marginally by the rib and a secure joint is made with the external surface of the wall 4 even though this is not a smooth surface. The hole in the washer may be such as to make a close fit around the screw and the rubber of the washer may be forced inwards by the clamping action to seal or help seal the washer to the screw, but generally a hemp grummet or wrapping 16a is clamped between the back nut and the coned disc and advantageously received in a recess 17 in the nut in order to seal the screw thread.

In some cases the hole 2 will be countersunk e. g., to form a dovetail recess, and it may be desirable to seal a joint ring into the said countersink or recess. Fig. 4 shows such an arrangement. In this case the joint ring 14a which may be of round section as shown, or a square, rectangular, or other suitable section, may be deformed in the countersunk part of the hole by the domed face of the disc 12. Thus by forming a domed disc with a marginal axial rib on an opposite diametral face thereof, as shown, one and the same domed disc may serve for sealing the pipe fitting with the rubber or like joint ring in the counterbore or with the rubber or like face joint washer if the counterbore is too small to receive the joint ring, all that is necessary being to replace the joint ring by the face joint washer and reverse the domed disc to present the ribbed side to the washer.

The cross-pin may be formed with a head at one end and the other end may be headed over after the particular joint member required has been selected and the parts suitably assembled to suit that member.

For securing the pipe fitting to the wall no machining of the hole is necessary. The aforesaid cross pin is allowed to hang fully to one side of the tube which is then inserted obliquely through the hole so that the cross pin hooks behind the wall whereupon the cross pin may be allowed to fall into a position in which it is centralised by the grooves engaging the limbs, or, with the cross pin in a substantially horizontal position, the pipe fitting is shaken to bring the cross pin into the said medial position in which it is seen or felt that it bridges the hole with the spaced annular grooves in the pin interlocking with the walls of the holes in the forking of the tube. In this position the cross pin bridges the hole internally of the wall 3 and tightening up of the nut tightens the joint ring or washer externally against the wall and seals off the pipe fitting which can then be connected to a hose or other external piping, or conduit.

Figs. 1 and 4 show the parts before the back nut has been tightened to make the joint.

In the form shown in Figs. 1 to 3, the pipe fitting may be so constructed and arranged as to permit the nut to screw thereon from the hose receiving end and in such cases the joint ring or washer and the domed disc may be placed on the pipe fitting after this has been inserted through the hole and the cross pin positioned to bridge the hole.

Where desired it will be easy to provide an elbowed pipe fitting, the elbow making any desired angle. Fig. 5 shows one such form in which a hose-receiving portion 5a is welded to the end of the screw tube, the meeting ends having mitred faces, but other known or suitable methods of connection are available, for example, the parts for this purpose may be turned from the bar on an automatic lathe to provide a stem and socket joint, which can subsequently be fused together, e., g., by copper brazing or welding. The outer end of the coupler tube may be of various forms for coupling the tube to a hose, flexible or rigid pipe or other suitable connection. For example a union nut may be rotatably mounted on the end of such tube.

In some cases, it is more convenient or necessary, as for example in Fig. 5, for the nut to screw on to the pipe fitting from the screw-threaded end, in which case the disc and packing ring or washer must be in position on the pipe fitting when it is inserted through the hole.

In general the fitter may be given a sight of the cross pin, whether a joint ring or face joint washer is used, while shaking such cross pin into a position in which it bridges the hole, preferably in interlocking relation with the fork ends as aforesaid, as the joint members and domed disc may be drawn back sufficiently for this purpose. If necessary a rod or wire or other tool may be inserted through the hole to move the rod into centralised position.

The fitting is applicable for various purposes, e. g., it may be used in connection with domestic hot-water tanks or motor vehicle foot warmers, but it is especially useful in connection with liquid circulating systems and heating means therefor comprising a thermo-siphonic liquid circulating system having two circuits including a common descending column, heat being applied to one of the circuits and liquid caused to flow from the heating means directly into a part of the circuit leading through a body to promote the heating of such body.

For example, referring to Fig. 6, for heating and circulating water by thermo-siphonic action through an engine water jacket there is a main circuit including the engine 20, radiator 21, inflow conduit 22 and outflow conduit 23 and part of the liquid contained in the inflow conduit 22 is diverted or drained into a conduit 24 which contains a heater 25 and communicates with the engine so as to form a second thermo-siphonic circuit adapted for operation in common with part of the main circuit. The liquid in the conduit 24 is thus heated at a position enabling thermo-siphonic action to be started or sustained in the second circuit thereby serving to heat and circulate the liquid in the main circuit, and causing the liquid in the second circuit being heated to flow through the engine jacket so as to promote the heating of the engine.

An electric heater of the flow through type may be used. The conduit 24 is conveniently furnished by flexible hose, for instance of rubber, forming pipe connections from said inflow portion 22 to an inlet of the heater and from an outlet of the heater to the engine jacket.

In such a case, the aforesaid hole 2 may be the core hole of an internal combustion engine of a motor vehicle where it is desired to promote heating of the cooling liquid of such engine on the thermo-siphonic principle as before mentioned.

The core hole is usually plugged and to fit the improved pipe fitting thereto the plug may be removed by piercing and withdrawing it with a chisel. The fitting can then be applied and the cross pin located in a position to bridge the core hole internally of the engine wall, tightening up of the nut tightening the packing externally against the engine wall and sealing off the pipe fitting which can then be connected to the heater and by a hose secured to the outlet of the heater and the tube by appropriate straining rings.

The cross pin may have a single annular groove 28a, see Fig. 8, and the coupler tube may have a single member 27, or as shown two diametrally opposite members 27, one of which will lock with the groove.

What we claim is:

1. A pipe fitting adapted to be clamped into sealing relation with a hole in a wall, comprising a screw-threaded tube and a nut-operated jointing means for sealing the fitting to the hole, one end of the tube being adapted to be passed freely through the hole and having a freely displaceable head of such dimensions as to be capable of bridging the hole and bearing on the inside of the wall on opposite sides of the hole, the head being adapted to be displaced in relation to the tube and passed obliquely through the hole and then shaken into a position to bridge the hole as aforesaid so that it will thrust against the said wall while the nut is operated to clamp the jointing means, and being adapted to be shaken into a position in which it may be easily withdrawn through the hole when the clamp is slackened.

2. A pipe fitting adapted to be clamped into sealing relation with a hole in a wall, comprising a screw-threaded tube and a nut-operated jointing means for sealing the fitting to the hole, one end of the tube being adapted to be passed freely through the hole and having a freely displaceable head in the form of a cross pin passing through opposed holes in the tube and headed to make the pin captive to the screw, the rod being of such length as to be capable of bridging the hole and bearing on the inside of the wall on opposite sides of the hole, the pin being adapted to be longitudinally displaced in cross-wise relation to the tube and passed obliquely through the hole and then shaken in the opposite direction into a position to bridge the hole as aforesaid so that it will thrust against the said wall while the nut is operated to clamp the jointing means, and being adapted to be shaken into a position in which it may be easily withdrawn through the hole when the clamp is slackened.

3. A pipe fitting as in claim 2, said cross pin having at least one annular groove adapted to lock the pin longitudinally with means on the tube.

4. A pipe fitting as in claim 2, in which the said tube has a bifurcated end in opposed limbs of which the opposed holes are formed so as not unduly to obstruct the flow through the tube, the bifurcated end providing opposed ports allowing flow therethrough as well as axially through the tube.

5. A pipe fitting as in claim 2, said cross pin having at least one annular groove adapted to be engaged by the walls of the opposed holes in the tube to locate the pin in operative position, the pin being free to be shaken into such position by shaking the fitting for clamping, and being adapted to be easily shaken free when the clamp is released.

6. A pipe fitting as in claim 2, said cross pin having annular grooves adapted by shaking the fitting to be engaged by the walls of the opposed holes in the tube to locate the pin in operative position, said holes being countersunk to facilitate the longitudinal displacement of the pin into or out of engagement with the walls of the holes.

7. A pipe fitting as in claim 1, comprising at least one joint ring or washer and a domed disc provided with a marginal rib on one face adapted to press a face joint washer into sealing engagement with the face of the object around the hole and being reversible to enable the domed face of the disc to press a sealing ring into a countersinking or recess of the hole, to make the sealing engagement.

8. A pipe fitting as in claim 1, in which the tube has an elbowed outer coupling end.

PERCY GRAHAM CALDWELL.
LIONEL WILLIAM HOPE-WALTON.

REFERENCES CITED

The following references are of record in the file of this patent:

UNITED STATES PATENTS

| Number | Name | Date |
|---|---|---|
| 1,463,510 | Jones | July 31, 1923 |
| 1,871,008 | Rentz | Aug. 9, 1932 |
| 2,360,395 | Byron | Oct. 17, 1944 |